(12) United States Patent
Abplanalp (10) Patent No.: US 6,343,713 B1
(45) Date of Patent: *Feb. 5, 2002

(54) FLEXIBLE BARRIER MEMBER USEFUL IN AEROSOL DISPENSERS

(76) Inventor: Robert Henry Abplanalp, Ten Hewitt Ave., Bronxville, NY (US) 10708

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,626

(22) Filed: Mar. 25, 1997

Related U.S. Application Data (63) Continuation of application No. 08/577,064, filed on Dec. 22, 1995, now abandoned, which is a continuation of application No. 08/442,638, filed on May 17, 1995, now abandoned, which is a continuation of application No. 08/253,143, filed on Jun. 2, 1994, now abandoned, which is a continuation-in-part of application No. 08/084,638, filed on Jun. 29, 1993, now abandoned.

(51) Int. Cl.$^7$ ............................................... B65D 35/28
(52) U.S. Cl. ..................... 222/95; 222/386.5; 222/387; 222/389
(58) Field of Search ....................... 222/95, 105, 386.5, 222/387, 389

(56) References Cited

U.S. PATENT DOCUMENTS

| | | | |
|---|---|---|---|
| 1,471,091 A | | 10/1923 | Bessesen |
| 2,208,744 A | * | 7/1940 | Bergerioux .......... 222/386.5 X |
| 2,533,428 A | | 12/1950 | Carpenter |
| RE23,343 E | | 2/1951 | Mercier et al. |
| 2,608,320 A | | 8/1952 | Harrison, Jr. |
| 2,649,995 A | | 8/1953 | Muskin |
| 2,671,579 A | | 3/1954 | Knoblock |
| 2,815,152 A | | 12/1957 | Mills |
| 2,889,078 A | | 6/1959 | Thomas |
| 2,953,304 A | * | 9/1960 | Sellinger ............. 222/386.5 X |
| 2,979,897 A | | 4/1961 | Studhalter et al. |
| 3,005,570 A | | 10/1961 | Maulaz |
| 3,018,970 A | | 1/1962 | Wittenberg et al. |
| 3,022,923 A | | 2/1962 | Hoffman, Jr. |

(List continued on next page.)

FOREIGN PATENT DOCUMENTS

| | | |
|---|---|---|
| CA | 695371 | 10/1964 |
| CA | 813196 | 5/1969 |
| EP | 0 309 499 B1 | 6/1993 |

OTHER PUBLICATIONS

Johnson, Montfort A., "The Technology Of Metal Aerosol Containers," *The Aerosol Handbook*, 2d Ed. 1982, pp. 101–110, Illinois, U.S.A.

(List continued on next page.)

*Primary Examiner*—Joseph A. Kaufman
(74) *Attorney, Agent, or Firm*—Kilgannon & Steidl (57) ABSTRACT

The present invention concerns a unitary flexible barrier for use in a plural-zoned, valved pressure container wherein the barrier has a shaped spatial form having sufficient rigidity to maintain its shape prior to insertion into and use in a plural-zoned, valved pressure container. The barrier comprises a flexible wall portion having an outer wall segment and an inner wall segment connected by an angled fold, the free terminal end of the outer wall segment forming a seal and the terminus of the inner wall segment distal to the fold extending into a central piston region that closes the barrier, and further wherein the outer wall segment is steeply frusto-conical in shape and terminates at its free end in a seal, and the inner wall segment is disposed in juxtaposed relation to the inner surface of the outer wall and in steeply frustoconical shape opposite to the frusto-conical shape of the outer wall segment so as to form a small acute angle between the outer wall segment and the inner wall segment; the terminus of the inner wall segment distal to the fold being closed by a central piston region to thereby complete the unitary barrier member.

21 Claims, 6 Drawing Sheets

U.S. PATENT DOCUMENTS

| | | | |
|---|---|---|---|
| 3,070,265 A | * | 12/1962 | Everett .................... 222/389 X |
| 3,109,463 A | * | 11/1963 | Clemens .............. 222/386.5 X |
| 3,115,280 A | | 12/1963 | Battista |
| 3,145,884 A | | 8/1964 | Everett |
| 3,174,658 A | | 3/1965 | Wittenberg et al. |
| 3,189,231 A | | 6/1965 | Kibbel, Jr. et al. |
| 3,190,562 A | | 6/1965 | Atwood et al. |
| 3,235,137 A | | 2/1966 | Bonduris |
| 3,275,193 A | * | 9/1966 | Barr .................... 222/386.5 X |
| 3,289,891 A | | 12/1966 | Frankenberg |
| 3,319,420 A | * | 5/1967 | Mercier .............. 222/386.5 X |
| 3,319,837 A | | 5/1967 | Mueller |
| 3,321,112 A | | 5/1967 | Cunningham et al. |
| 3,342,377 A | | 9/1967 | Peredy |
| 3,343,422 A | | 9/1967 | McSmith |
| 3,378,169 A | | 4/1968 | Clark et al. |
| 3,393,842 A | | 7/1968 | Bruce et al. |
| 3,407,974 A | | 10/1968 | Chmielowiec |
| 3,408,731 A | | 11/1968 | Mercier |
| 3,415,425 A | * | 12/1968 | Knight et al. ............ 222/386.5 |
| 3,430,731 A | | 3/1969 | Satzinger |
| 3,464,593 A | | 9/1969 | Abplanalp |
| 3,494,513 A | * | 2/1970 | Bauer ..................... 222/386.5 |
| 3,516,578 A | | 6/1970 | Grossman et al. |
| 3,548,564 A | | 12/1970 | Bruce et al. |
| 3,570,544 A | | 3/1971 | Ortheil |
| 3,589,862 A | | 6/1971 | Veloz |
| 3,625,256 A | | 12/1971 | Smith |
| 3,659,675 A | | 5/1972 | Edelstein et al. |
| 3,721,371 A | | 3/1973 | Dolveck |
| 3,756,476 A | | 9/1973 | Bonduris |
| 3,788,521 A | | 1/1974 | Laauwe |
| 3,813,011 A | | 5/1974 | Harrison et al. |
| 3,819,092 A | | 6/1974 | Bonduris |
| 3,847,307 A | | 11/1974 | Hosek |
| 3,847,309 A | | 11/1974 | Grossman |
| 3,874,052 A | | 4/1975 | Schantz |
| 3,876,119 A | | 4/1975 | Lamkin |
| 3,895,746 A | | 7/1975 | Bauer |
| 3,896,970 A | | 7/1975 | Laauwe |
| 3,929,132 A | | 12/1975 | Higuchi |
| 3,940,031 A | | 2/1976 | Fishman |
| 3,976,223 A | | 8/1976 | Jass et al. |
| 3,981,418 A | | 9/1976 | Williamson et al. |
| 3,986,641 A | | 10/1976 | Casey |
| 3,989,165 A | | 11/1976 | Shaw et al. |
| 3,992,003 A | | 11/1976 | Visceglia et al. |
| 3,995,632 A | | 12/1976 | Nakano et al. |
| 3,995,723 A | | 12/1976 | Holcomb, Jr. |
| 3,998,359 A | | 12/1976 | Pettit |
| 4,034,896 A | | 7/1977 | Wilson |
| 4,045,860 A | | 9/1977 | Winckler |
| 4,067,499 A | | 1/1978 | Cohen |
| 4,087,026 A | | 5/1978 | Petterson |
| 4,113,151 A | | 9/1978 | Brown et al. |
| 4,129,025 A | | 12/1978 | Carey et al. |
| 4,148,416 A | | 4/1979 | Gunn-Smith |
| 4,162,030 A | | 7/1979 | Capra et al. |
| 4,174,767 A | | 11/1979 | Kramer |
| 4,185,758 A | | 1/1980 | Giggard |
| 4,189,069 A | | 2/1980 | Stoody |
| 4,191,305 A | | 3/1980 | Davis |
| 4,199,082 A | | 4/1980 | Ornsteen |
| 4,202,470 A | | 5/1980 | Fujii |
| 4,213,545 A | | 7/1980 | Thompson et al. |
| 4,265,373 A | | 5/1981 | Stoody |
| 4,280,637 A | | 7/1981 | Runciman |
| 4,295,582 A | | 10/1981 | Acres |
| 4,305,428 A | | 12/1981 | Burton |
| 4,322,020 A | | 3/1982 | Stone |
| 4,355,736 A | | 10/1982 | Schumacker et al. |
| 4,437,590 A | | 3/1984 | LaBruna |
| 4,491,250 A | | 1/1985 | Liebermann |
| 4,585,143 A | | 4/1986 | Fremow et al. |
| 4,679,706 A | | 7/1987 | Magid et al. |
| 4,723,577 A | | 2/1988 | Wusterbarth |
| 4,844,301 A | | 7/1989 | Juillet |
| 4,889,189 A | | 12/1989 | Rozniecki |
| 4,896,794 A | | 1/1990 | Banks et al. |
| 4,923,095 A | | 5/1990 | Dorfman et al. |
| 4,969,577 A | | 11/1990 | Werding |
| 4,978,033 A | | 12/1990 | Chou |
| 5,007,556 A | | 4/1991 | Lover |
| 5,009,340 A | | 4/1991 | Morane |
| 5,037,367 A | | 8/1991 | Hardt et al. |
| 5,060,826 A | | 10/1991 | Coleman |
| 5,102,311 A | | 4/1992 | Lambeck |
| 5,115,944 A | | 5/1992 | Nikolich |
| 5,135,137 A | | 8/1992 | Rudick |
| 5,143,390 A | | 9/1992 | Goldsmith |
| 5,301,838 A | | 4/1994 | Schmidt et al. |

OTHER PUBLICATIONS

"Bamer Pressure Packs With Aluminum Pouch," Lechner Brochure, p. 3.

Rem, Joseph P., "American Is Left Holding The Bag—A Review Of The Sterigard System," *Aerosol Age*, May 1971, p. 36, U.S.A.

"Introducing The Preval," *Aerosol Age*, Jan. 1966, p. 29 U.S.A.

Clark, Tom C., "A European Contribution To The Piston Can," *Aerosol Age*, Feb. 1966, p. 28, U.S.A.

"Second Generation Geigy Innovair$^R$ System," *Aerosol Age*, Jan. 1970, p. 82, U.S.A.

Boden, Herbert, "Hot Shave Technology," *Aerosol Age*, Mar. 1968, p. 19, U.S.A.

"Key Piston—A New Aerosol Patent," *Aerosol Age*, Jul. 1968, p. 52, U.S.A.

Casey, Don E., "Aeratron Barrier Pack System Now In Production," *Aerosol Age*, Apr. 1975, p. 30, U.S.A.

Irland, L.F. and Kinnavy, J.W., "The Sepro Can," *Drug & Cosmetic Industry*, vol. 101, No. 2, Aug. 1967, p. 42, U.S.A.

Thornton, Jr., M.L., "Geigy's Innovair Aerosol System," Detergent Age, Aerosol Packaging/Marketing Supplement, May 1968, p. 151, U.S.A.

"Selvac Is Back," *Aerosol Age*, Jun. 1972, p. 27, U.S.A.

Hoffman, Jr., H.T., "The Free–Piston Aerosol," *Modern Packaging*, Aug. 1961, p. 129, U.S.A.

Boyne, Robert W., "The Aluminum–Plastic Piston Aerosol," *Detergent Age, Aerosol Packaging/Marketing Supplement*, May 1968, p. 147, U.S.A.

Schultz, R.S., "Free Piston Container," *Soap and Chemical Specialties*, Mar. 1962, p. 127, U.S.A.

"Sterigard Seeks Brader Applications For Bag–In–A–Can Aerosol," *Detergent Age, Aerosol Packaging/Marketing Supplement*, May 1968, p. 142, U.S.A.

"Cebal Unveils Presspack System—A New Pressure Container," *Aerosol Age*, May 1973, p. 38, U.S.A.

Sciarra, John J. and Stoller, Leonard, "Types Of Aerosol Systems." *The Science And Technology Of Aerosol Packaging*, Publ. 1974 by John Wiley & Sons, Inc., U.S.A., p. 50.

Sanders, Paul A., "Miscellaneous Aerosol Systems," *Principles Of Aerosol Technology*, Publ. 1970, Van Nostrand Reinhold Co., U.S.A., p. 350.

Sanders, Paul A., "Containers," *Handbook Of Aerosol Technology*, Publ. 1979, Van Nostrand Reinhold Co., U.S.A. p. 73.

"Rollbag–When Your Product Is Delicate," Boxal UK Brochure, 199_.

* cited by examiner

FLEXIBLE BARRIER MEMBER USEFUL IN AEROSOL DISPENSERS

This application is a continuation application of U.S. patent application Ser. No. 08/577,064, filed Dec. 22, 1995 (now abandoned), which is a continuation application of U.S. patent application Ser. No. 08/442,638, filed May 17, 1995 (now abandoned), which is a continuation application of U.S. patent application Ser. No. 08/253,143, filed Jun. 2, 1994 (now abandoned), which is a continuation-in-part of U.S. patent application Ser. No. 08/084,638, filed Jun. 29, 1993 (now abandoned).

BACKGROUND OF THE INVENTION

1. Field of the Invention

This invention relates to pressurized dispenser packages, such as aerosol packages, wherein the product to be dispensed and the pressure-generating media, i.e. the propellant, are maintained in isolation through separation on opposite sides of a barrier. An aerosol package of this type is generally referred to as a "barrier pack" aerosol package.

2. Description of the Prior Art

Aerosol barrier packs of the prior art have been of at least three general types. In the piston-type barrier pack the barrier is a piston-like component that is mounted in the container in sliding relation to the inside surface of the container. The product to be dispensed is disposed on the valved side of the piston and the propellant, which generates pressure within the container, is on the opposite side of the piston. In Aerosol Handbook, Second Edition, 1982, there is described a piston-type aerosol dispenser marketed by American Can Company under the trade-name "Mira-Flo". In the Mira-Flo dispenser the piston skirt is designed to seal against the sides of the container to prevent the propellant gas from passing into the product chamber on the other side of the piston. Actuation of the aerosol discharge valve causes a reduction in pressure in the product chamber thereby resulting in the pressure in the propellant chamber urging the piston toward the discharge valve and causing the discharge of product through the discharge valve. Examples of a piston-type barrier pack are described in U.S. Pat. Nos. 3,022,923, 3,756,476 and 3,929,132.

In a second type of aerosol barrier pack, a flexible, collapsible bag is affixed within the container opening either to the aerosol discharge valve or to the bead of the container opening. The Continental Can Company in the late 1960's introduced an aerosol barrier dispenser known as the "Sepro-Can". The Sepro-Can includes an interior plastic product bag having an opening that is attached to the valve opening at the top of the container. The side walls of the bag extend along the side walls of the container and are pleated like an accordion so the bag can collapse inward and upward under the influence of pressure in the remainder of the container as the bag is emptied. Patents which illustrate a barrier pack of the second type are set forth in U.S. Pat. Nos. 3,788,521, 3,896,970 and 4,067,499. Modifications of barrier packs of the second type include attaching the bag to the side wall of the container or to the joint formed between the side wall of the container and the top of the container.

A third type of prior art barrier pack is an unfolding cup-shaped barrier wherein the barrier has an outer wall terminating in a sealing flange, said outer wall being disposed contiguous to the inner wall of the container. The inner wall of the barrier is initially folded within the outer wall, the inner wall terminating in an end closing portion. The barrier is contained in a valved aerosol container and sealed at the joint formed between the sidewall and the bottom end closure of the container. Product is admitted through the valved opening of the container and propellant through a port in the bottom end closure of the container. Actuation of the valve reduces the pressure in the product compartment and results in the inner wall of the barrier unfolding from within the outer wall of the barrier and causing the end-closing portion of the inner wall of the barrier to advance and thereby urge the product toward the discharge valve. A patent which illustrates the third type of prior art barrier pack is U.S. Pat. No. 3,109,463.

A problem with the piston-type barrier pack of the first type is the imperfect seal between the side skirt of the piston and the side wall of the container which allows propellant to seep into the product with consequent discharge of propellant during product discharge as well as contamination of the product with propellant. Also, it is not uncommon for aerosol containers to be dented and thus lose their true circumferential shape, with the consequence that the piston is incapable of axial movement within the container past the aberrant configuration.

A problem with barrier packs of the second type wherein the barrier is affixed to the valve or valve opening of the container is that the barrier collapses in a manner to cause pocketing of the product within the collapsible barrier with consequent undesirable diminution of the evacuation of the product from the container.

In the third type of prior art barrier pack described herein, the unfolding cup-shape barrier does not advance progressively and uniformly against the inner wall of the container but tends to pocket and entrap product against the wall or within pockets formed in the barrier itself as it unfolds. Attempts to solve these problems have included adding an additional rigid piston to the end-closing portion of the inner wall, or adhering the outer wall of the barrier in peelable fashion to the inner wall of the container. Generally, barriers of the third type can be difficult to form, as well as to insert into and seal with the container.

There is, therefore, a need for a flexible product/propellant barrier for an aerosol container that is easy to manufacture and ship, that is easy to insert into and seal to the container, that prevents leakage of the fluids from one compartment to the other compartment, and that does not pocket and therefore preclude evacuation of significant amounts of the product to be discharged.

SUMMARY OF THE INVENTION

The present invention relates to an improvement in the third type of barrier pack. In its broadest aspect, the present invention concerns a unitary flexible and expandable barrier for use in a plural-zoned, valved pressure container wherein the barrier has a shaped spatial form having sufficient rigidity to maintain its shape prior to insertion into and use in a plural-zoned, valved pressure container. The barrier comprises a flexible and expandable wall portion having an outer wall segment and an inner wall segment connected by an angled fold, the free terminal end of the outer wall segment forming a sealing means and the terminus of the inner wall segment distal to the fold extending into a central piston region that closes the barrier. In a preferred form, the outer wall segment is steeply frustoconical in shape and terminates at its free end in a sealing means, and the inner wall segment is disposed in juxtaposed relation to the inner surface of the outer wall and in steeply frustoconical shape opposite to the frustoconical shape of the outer wall segment so as to form a small acute angle between the outer wall segment and the inner wall segment; the terminus of the inner wall segment distal to the fold being closed by a central piston region to thereby complete the unitary barrier member. Further, the inner wall segment is sufficiently flexible to permit the inner wall segment and said central piston region to move in an axially upward direction under the influence of propellant pressure and for the inner wall segment to reverse its frustoconical shape. Still further, the outer wall segment has sufficient expandability to expand outwardly under the influence of propellant pressure to progressively and substantially conform to the inner surface of the container from the terminal sealing means to the fold, and the inner wall segment has sufficient expandability to expand outwardly under the influence of propellant pressure to substantially conform to the inner surface of the container from the fold upward as the inner wall segment reverses its shape.

By virtue of having sufficient rigidity to maintain its shape prior to insertion into the container, as well as the presence of the tapered outer wall segment, the barrier of the present invention is very easily insertable into the bottom of the container. By virtue of the tapered outer and inner wall segments, the barrier is nestable with like barriers for convenience and cost savings in shipping. Further, the nesting facilitates fast and simple machine feeding of stacked barriers sequentially into the containers.

In a preferred form of the invention the outer wall segment is thicker and more rigid than the inner wall segment; the inner wall segment also is of slightly less length than the outer wall segment; and the sealing means is a radially extending flange which acts as a gasket between the bottom of the sidewall of the container and the bottom closure of the container. The central piston region also may be thicker than the inner wall segment.

The overall length of the flexible and expandable wall portions and the contour of the central piston region is designed such that the barrier upon full evacuation of the product from the pressurized container will tend to press against all inner surfaces of the container to thereby maximize the evacuation of the container contents.

A particularly advantageous material for barriers is polyethylene terephthalate (PET). Where permeation across the barrier is a concern, the barrier of the present invention may utilize a unitary multi-layer configuration. Such multi-layer configurations, their materials of construction and their manufacture, are well known to those skilled in the art. Generally, in a three-layer system, the inner layer is a material that prevents transport of propellant and product therethrough and the outer layers are inert to the propellant and product.

DETAILED DESCRIPTION OF THE INVENTION

Figures 1, 2:
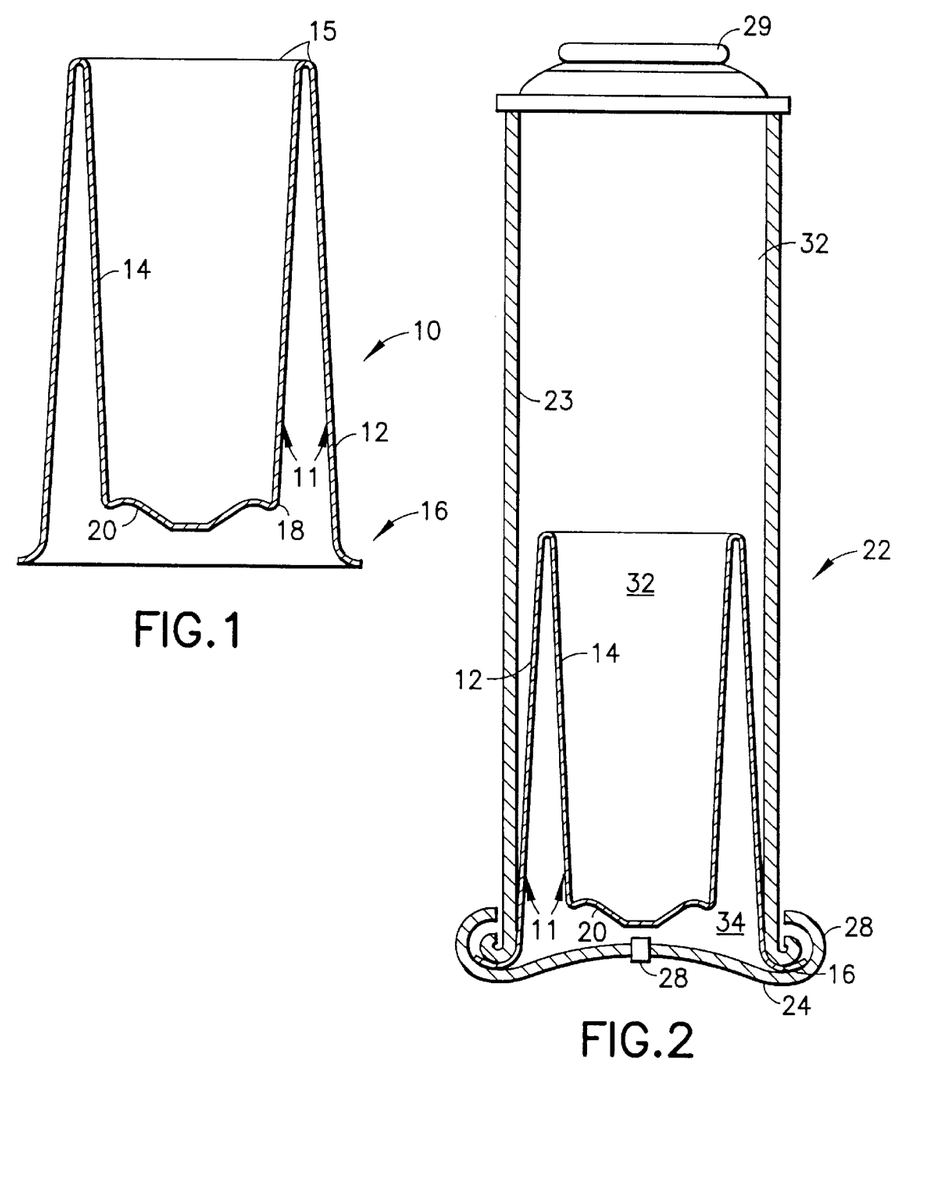
FIG. 1 is an elevational cross-sectional view of an embodiment of barrier of this invention.
FIG. 2 is an elevational cross-sectional view of the barrier to of FIG. 1 positioned within an empty aerosol container with the top opening of the container shown in schematic and the aerosol valve not shown.

Referring now to the drawings, FIG. 1 shows a unitary barrier generally designated at 10, as it is initially formed, said barrier having a wall 11 comprising a flexible and expandable outer wall segment 12 and a flexible and expandable inner wall segment 14 connected by a fold 15, the outer wall segment 12 terminating in a sealing flange 16. At the terminus 18 of the inner wall segment 14, central piston region 20 extends inwardly to close the barrier. It should be noted that the outer wall segment 12 has a steeply frusto-conical shape extending from the sealing flange 16 to the fold 15, and that the inner wall segment 14 has a steeply frustoconical shape oppositely directed to the outer wall segment 12 extending from the fold 15 to the central piston region 20.

The outer wall segment 12, including the sealing flange 16, is sufficiently thick and rigid to impart a shaped spatial form to the barrier and causes the barrier to be free-standing and ready for insertion into the container.

It has been found that a barrier formed of PET with the following dimensions has performed satisfactorily as a barrier in a pressurized container:

Sealing Flange Thickness—0.007"

Outer Wall Segment Thickness—0.007" adjacent the flange narrowing to 0.004" at the fold Inner Wall Segment Thickness—0.004" adjacent the fold narrowing to 0.002" adjacent the central piston region Central Piston Region—0.002" at the joinder of the inner wall segment and the central piston region and increasing to 0.004" immediately within the aforesaid joinder and thickening to 0.007" at the center area of the piston Length of Outer Wall Segment—3⅛"

Length of Inner Wall Segment—2¹⁹⁄₃₂"

Container used with aforedescribed PET barrier was a 202×509 straight sided can which is 2⅛" in diameter and 5⁹⁄₁₆" in length.

The barrier had a 1° taper to each of the outer and inner wall segments, 12 and 14, respectively, to form a fold 15 providing an included angle of 2° between the outer and inner wall segments, 12 and 14. It is believed that a 3° taper to each of the inner and outer wall segments will also function satisfactorily. The central piston region for the above-described barrier had a configuration as shown in FIG. 1, wherein the terminus 18 at the perimeter of the piston had a depth of 0.188" and a radius of 0.063". The sealing flange 16 for the described barrier had a turning radius into outer wall segment 12 of 0.078".

FIG. 2 shows the barrier 10 inserted in a valved pressure container generally designated as 22, having inner wall surface 23, and permanently joined to the container through the sealing flange 16 by an appropriate crimping of the flange 16 between the joint formed by the lower end 24 of the sidewall of the container 22 and the perimeter of the bottom closure 26 of the container 22. without intention to limit the type of pressure container (aerosol) with which the barrier pack of this invention may be usefully employed, it has been found particularly useful when employed with an aerosol container commonly referred to as a "necked-in" container. A sealable port 28 is provided in the bottom closure 26 for introduction of propellant. A manually actuable valve (not shown) is positioned in a manner well-known to those skilled in the art in the opening 29 of the pressure container 22.

In FIG. 2, the barrier 10 divides the interior of the container 22 into a plural zoned pressure container; the upper zone 32 for receiving the product to be dispensed and the lower zone 34 for receiving the propellant. Generally, the container manufacturer will insert the barrier 10 into container 22, and seal the barrier to the container as described above. A product filler will thereafter fill the product and propellant into the respective chambers 32 and 34.

For many applications of the barrier pack of the present invention within an aerosol container, the barrier 10, as shown in FIG. 1, will be inserted and bottom sealed into the container 22 as shown in FIG. 2 and as described above.

Alternatively, after bottom sealing the barrier 10 within the container 22 as shown in FIG. 2, and with the aerosol valve in place in the container 22, propellant may be admitted to the container 22 in the zone 34 to cause the barrier 10 to fully or partially expand (shown as fully expanded in FIG. 4b) within the container 22, it being understood that the aerosol valve in the container opening, if present, must be opened to allow the barrier to expand. After the barrier 10 has expanded within the container 22, product may be pressure filled into the zone 32 to cause the barrier 10 to refold to the shape, or similar to the shape, as shown in FIG. 2.

A further alternative is to top seal the barrier pack of this invention, i.e. to invert the barrier pack of this invention and seal the sealing flange 16 between the top portion of the container 22 and the upper sidewall of the container 22. In such a top sealing arrangement, product may be introduced into the product zone to cause the barrier 10 to fully expand downwardly within the container 22 to substantially conform to the inner surface 23 of the container 22. During the filling of the product into the container it may be necessary to provide a means for evacuating air in the propellant zone. After introducing propellant into the propellant zone, the container is ready to function to discharge product through actuation of the aerosol valve positioned in the container opening 29. Upon complete evacuation of product from the container 22, the barrier 10 will assume a shape such as in FIG. 1, wherein the inner wall 14 will be folded within the outer wall 12 but, with the sealing flange 16 being top sealed, the barrier 10 will be in an inverse relation within the container as that shown in FIG. 2. It is preferable in both of the alternative arrangements and procedures described immediately above that the outer wall 12 be substantially thicker and more rigid than the inner wall 14.

Figure 3:
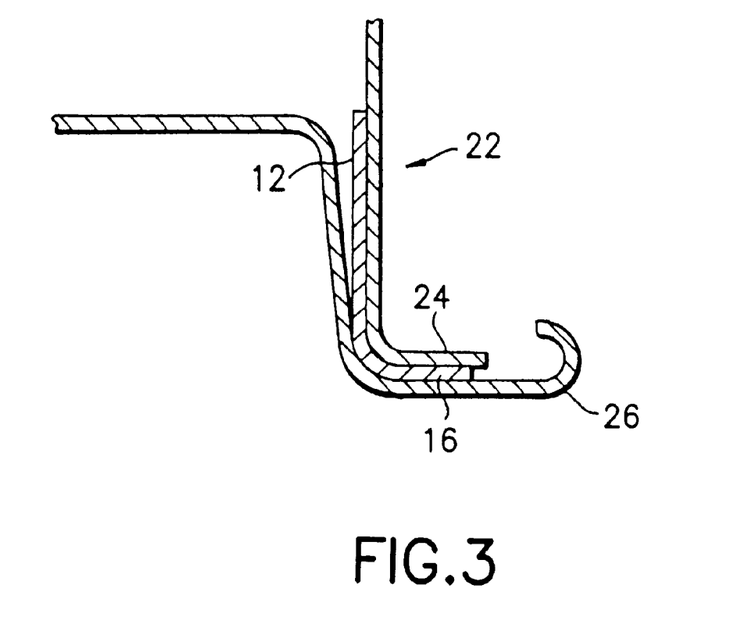
FIG. 3 is a schematic cross-sectional view of an embodiment for forming the seal between the barrier sealing means, the sidewall of the container and the bottom closure of the container.

FIG. 3 shows a configuration for annexing the barrier 10 to the container 22. FIG. 3 shows the barrier sealing means to be a terminal flange 16 extending from the outer wall segment 12. The flange 16 fits tightly between the flanges 24 and 26. The seam is formed by rolling the flanges 24, 26 and 16 toward the side wall 12 to form a rolled seam by techniques known to those skilled in the art. A double roll seam may be used. The thickness and length of the sealing flange 16 is dictated by the requirements of rolled seams, which may vary by type of container and rolling equipment. The sealing flange 16 may be thicker than the contiguous outer wall segment 12. The sealing flange 16 may function as a gasket in sealing the barrier to the base of the container. If necessary, an adhesive may be provided to the components that are to be roll seamed.

Figure 4A:
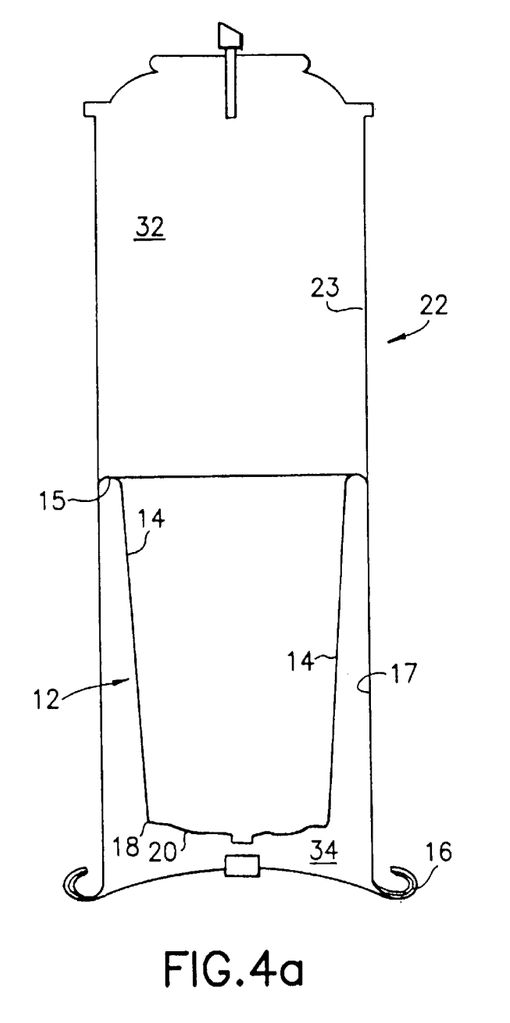
FIGS. 4a and 4b are schematic views of the barrier of this invention within an aerosol container showing, in FIG. 4a, the barrier in an initial position a short period of time after loading the container with product and propellant; and, in FIG. 4(b) the ultimate contour of the barrier after evacuation of the product from the container.
Figure 4B:
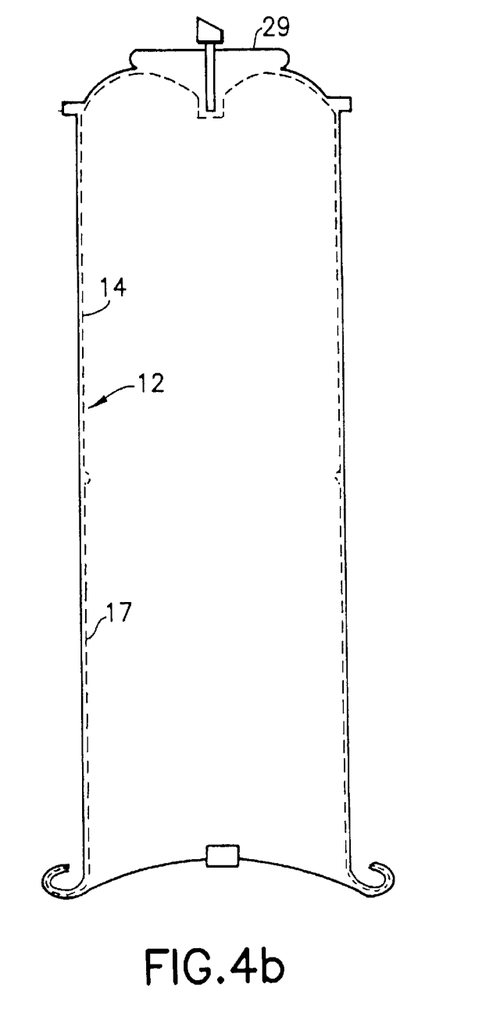

FIG. 4a shows the barrier in an initial position a short period of time after loading the container with product and propellant. During this short period of time before consumer usage, the outer wall segment 12 has expanded due to propellant pressure, from its FIG. 2 position, to contact and to fully conform to the inner wall surface 23 of the container 22. Due to the frustoconical shape of the outer wall segment 12, the contact and conformance of the outer wall segment occurs progressively upwardly from flange 16 to fold 15, thereby clearing the space between the outer wall segment 12 and the inner wall surface 23 of the container 22 of product.

Upon continuous or intermittent actuation of the valve disposed in the top opening of the pressurized container, product will be evacuated from the container by lowering the pressure in the product zone 32 and causing the greater pressure in the propellant zone 34 to expand the barrier against the product and force the product through the discharge valve of the container. As product is evacuated from the container 22, the inner wall segment 14 and the central piston region 20 move axially toward the aerosol discharge valve as the barrier unfolds.

The barrier may be dimensioned such that after evacuation of most of the product in the container the central piston region has not yet risen high enough to shut off the product discharge orifice(s) in the valve. As evacuation nears its completion, the barrier may expand to assume the configuration shown by the dotted line in FIG. 4b, it being understood that in FIG. 4b the outer and inner wall segments 12 and 14 contact and fully conform to the inner wall surface 23.

It has been observed that the frustoconical configuration of the inner wall segment 14, as well as the expandable nature of the barrier 10 toward the inner wall surface 23 of the container 22, results in the outer surface of the inner wall segment progressively advancing in an axial direction against the inner wall surface 23 of the pressure container to cause the progressive advance of the product to the discharge valve and a minimization of the capture or entrapment of product between the outer surface of the barrier and the inner surface of the container. Pockets are not observed to form within the barrier itself.

Figure 7:
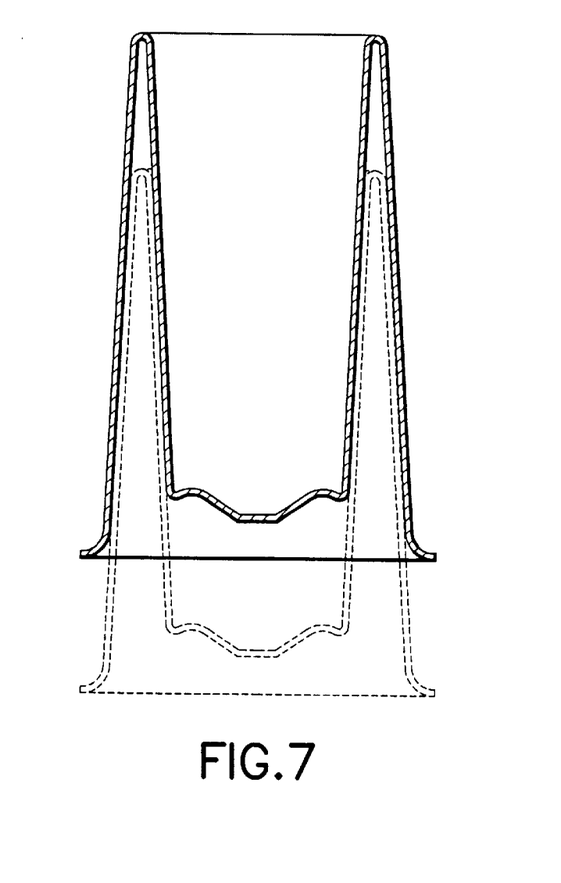
FIG. 7 shows barriers of this invention in a nesting relation.

The tapering of the outer wall segment facilitates the invagination of the barrier of the present invention into the pressurized container. The presence of the tapering of both the outer and inner wall segments, and at small angles, also allows maximum nesting of the barriers for convenience and cost savings in shipping the barriers from a manufacturing site to the site of the container manufacturing operation. At the container manufacturing site, the stacks of nested barriers facilitate fast and easy feeding of the barriers sequentially into the containers. Each nested barrier may be pulled from its stack into its intended container under the influence of an initial vacuum in the container shell, each barrier as it is inserted into its container shutting off the vacuum; alternatively each nested barrier may be blown by air from its stack into the intended container. The next container shell is fed under the stack of nested barriers, and the identical action continues for the next container and next barrier. Containers continue to be sequentially fed under the nested stacks of barriers, and the nesting provides for a high speed and very simple feeding operation.

Figure 6:
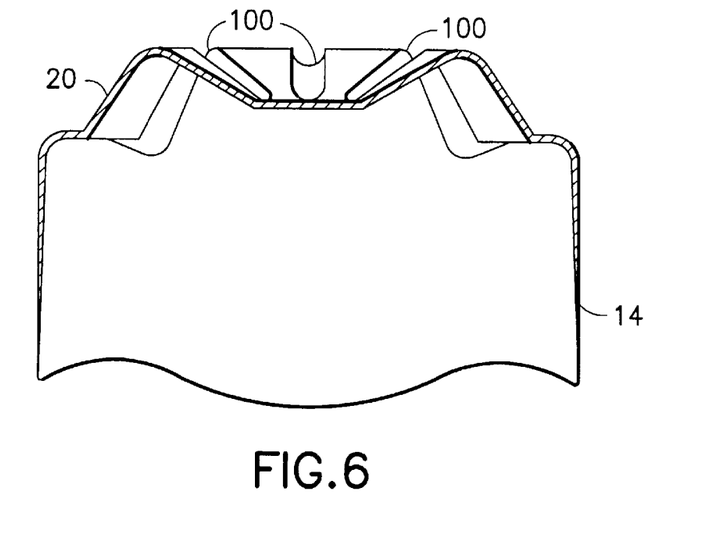
FIG. 6 is a cross-sectional view of an embodiment of the central piston region of the barrier of this invention.

FIG. 6 shows an embodiment of the central piston region 20 which includes a plurality of reinforcing ribs 100 that add to the strength of the central piston region 20. Depending on the weight and type of product being dispensed, it may be preferable to have a thicker and/or reinforced central piston region and/or thicker wall segments in order to insure uniform and complete discharge of the product. Alternatively, it may be desirable to have the central piston region thinner than the contiguous inner wall segment to enable the central piston region to expand fully into the upper recesses of the container.

Figure 5:
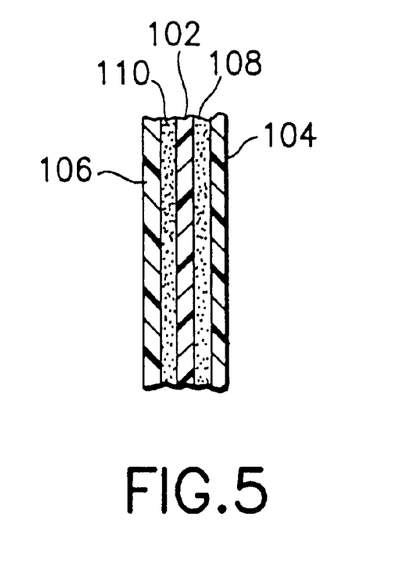
FIG. 5 is a partial cross-sectional view of a multi-layered barrier of the present invention.

In order to overcome the problem of permeation of propellant and/or product through the barrier found in prior art dispensers, the flexible barrier in accordance with the present invention is optionally made of a multi-layered material. FIG. 5 shows a wall construction consisting of an inner layer 102 designed to prevent transport of propellant and product. Layer 102 is sandwiched between outer layers 104 and 106 that are inert to propellant or product in contact with the outer layers. Adhesive layers 108 and 110 are optionally provided, or alternatively the inner and outer layers 102, 104 and 106 may be fused together by heat or other means. In one embodiment, the inner layer 102 is a gas barrier layer and the outer layers 104 and 106 are aqueous or organic fluid barrier layers. The gas barrier layer may be made of PET, ethylene vinyl alcohol, polyvinylalcohol, polyvinylidene chloride, polyacrylonitrile, cellophane or other similarly suitable materials. The outer layers may be made of PET, polyethylene, (especially high density polyethylene) polypropylene, polytetrafluoroethylene, polybutane, surlyn ionomer, butyl rubber, polyvinylidene chloride, polychlorotrifluoroethylene, Penton, polyvinylfluoride or other similarly suitable materials. Ethylene vinyl alcohol and polyvinyl alcohol are preferred gas barrier materials and high density polyethylene is a preferred aqueous or organic fluid barrier material.

Any propellants known in the art may be used with the dispenser and flexible barrier of the present invention. The barrier of the present invention requires smaller amounts of liquified propellants than required in non-barrier pack aerosol systems and in certain barrier pack systems using compressed gases, thus allowing the economic use of more expensive propellants. The present system lends itself to a maximization of the amount of product to be dispensed from a given container.

Figure 8:
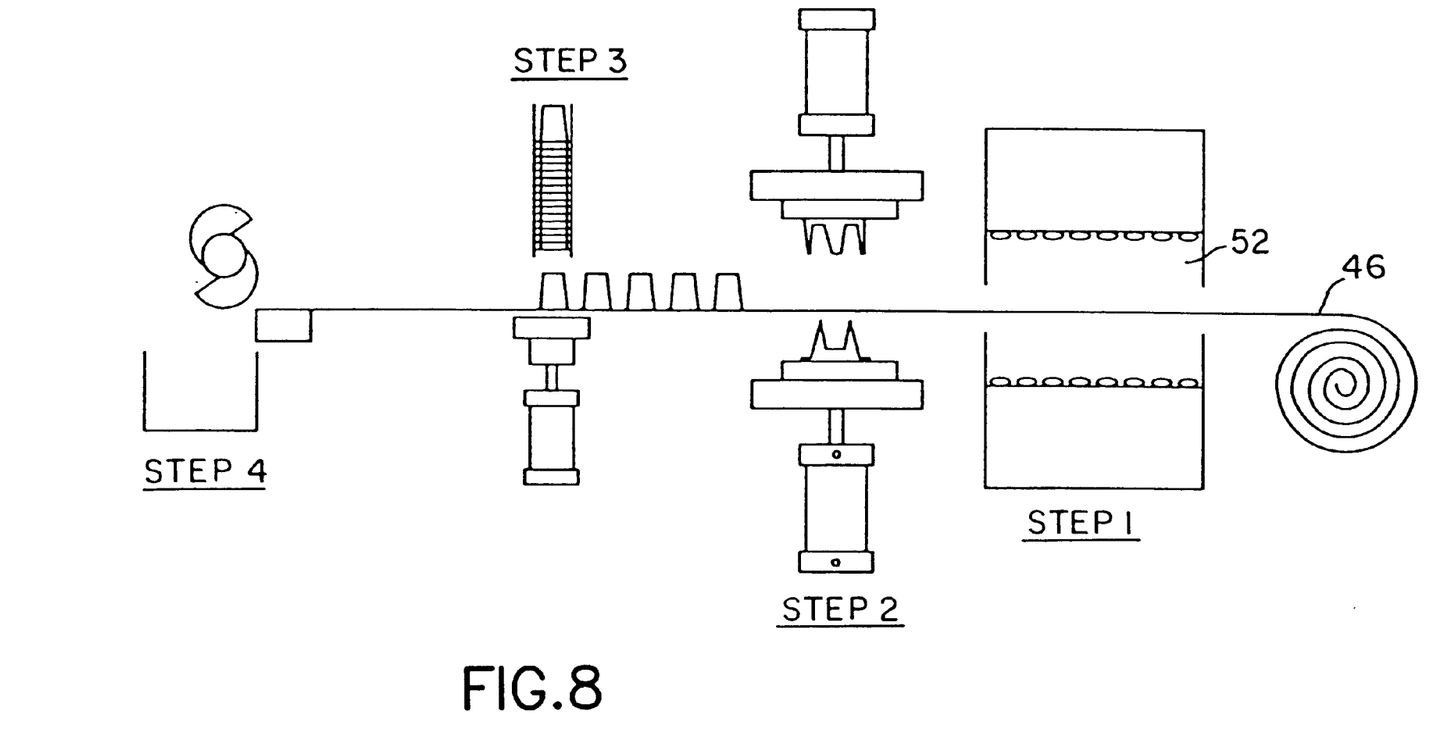
FIG. 8 is a schematic diagram of the several steps used in fabricating the barrier pack of this invention from a plastic sheet.

The barrier pack of this invention is presently manufactured utilizing a forming process generally referred to as thermoforming. The thermoforming technique for manufacturing plastic shapes from a sheet of the plastic material is well-known in a general sense. Specific modifications of the general techniques are used to tailor the thermoforming process to the forming of a particular shape. The schematic diagram of FIG. 8 shows the several steps involved in the forming of the barrier packs of this invention. In step 1, the plastic sheet material, PET, for example, having a thickness of 0.025", is passed through a dry heat zone (oven) to bring the PET to a forming temperature of 250°–330° F. It is desirable to have the PET at 285°–300° F., that is, to avoid the extremes of the 250°–330° F. range. The PET material found suitable for forming the barrier packs is biaxially oriented and suitable for deep draw thermoforming.

The barrier pack of this invention is a deep drawn part and thus is susceptible to "webbing", i.e. the formation of a fold of excess material at the mold base and the barrier side wall. Where "webbing" is a concern, careful control of the temperature of the plastic sheet material is critical. Moreover, with temperature control and avoidance of a temperature above the distortion temperature of the plastic sheet material, a degree of plastic memory is retained by the plastic material, this memory aiding in the preclusion or removal of the "webbing" problem.

In step 2, the pre-heated PET sheet is moved to the forming station (thermoformer), whereat the PET sheet is prestretched using a "plug assist" for the initial forming of the inner wall segment and the piston region of the barrier pack and using a "ring" to partially form the outer wall segment. Also see FIG. 9. The "ring" assists in the avoidance of "webbing". The "plug assist" and "ring" are mounted on the upper movable platen (top base plate) of the thermoformer equipment, directly across from the lower movable platen (base plate) on which the mold is mounted. After disposing the heated plastic sheet between the upper and lower platens, the forming operation is commenced by moving the platens toward each other to sandwich the heated sheet. During the course of moving the platens until their ultimate contacting against each other, the "plug assist" and "ring" draw the sheet into and around the interior cavity surface of the mold to force the heated PET sheet to conform and contact the mold at the fold joining the outer wall segment and the inner wall segment and at the base of the "ring". The "ring" in forcing the PET plastic sheet against the base plate of the thermoforming equipment effects an annular seal around the mold. After effecting the seal, vacuum is applied to the mold to cause the PET plastic sheet to be drawn against the mold surface and thereby complete the final shaping of the PET plastic sheet.

Figure 9:
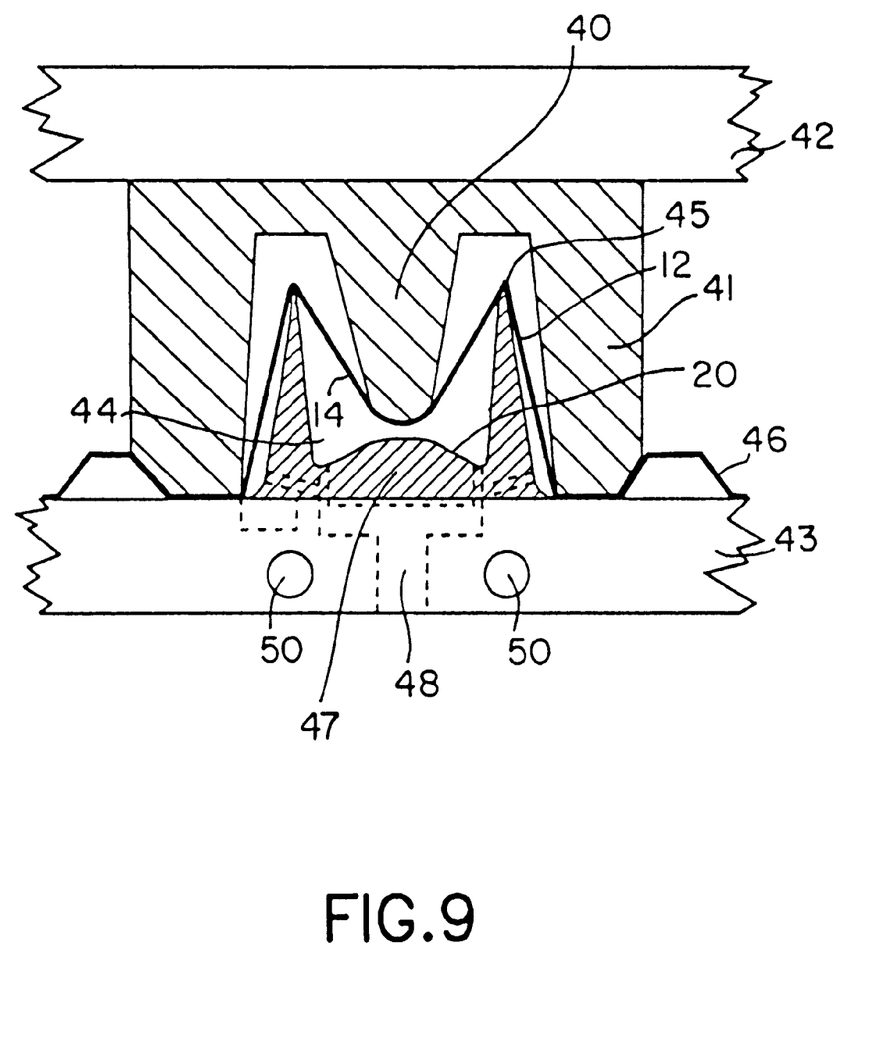
FIG. 9 is a schematic of the thermoforming equipment used in forming the barrier pack of this invention.

The mold is water cooled, teflon coated aluminum, heat conductive, and the "assist" and "ring" are fine-grained wood covered with felt to avoid scuffing and sticking of the formed part.

After adequate cooling, the upper and lower platens are separated and the formed sheet transported to the trimming station (step 3) whereat cutting dies trim the formed parts. The formed parts are ejected to a stacker and the trimmed residue at the sealing flange is ground for recycling and reclaiming in the plastic sheet extrusion process.

It is believed that biaxial orientation of the plastic during the extrusion of the plastic sheet to be thermoformed and the biaxial orientation during the thermoforming process decrease the permeation of the barrier material.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

I claim:
1. A unitary flexible barrier for use in a plural-zoned, valved pressure container comprising:
   a shaped spatial form having a terminal sealing means, a flexible wall portion, and a central piston region, said sealing means, wall portion and piston region being formed as a unitary spatial form with sufficient rigidity to maintain its shape prior to insertion into and use in a plural-zoned pressure container;
   said terminal sealing means being adapted for sealing in a container to form a propellant zone and a product zone;
   said flexible wall portion having an inner wall segment and an outer wall segment connected by a fold;
   said outer wall segment being a steeply frusto-conical shape and extending upwardly from the terminal sealing means to the fold, said outer wall segment and fold being dimensioned for insertion into the bottom of a container to form an initial spaced relationship with the inner side container surface;
   said inner wall segment being an oppositelydirected, steeply frusto-conical, shape contained within the outer wall segment and extending downwardly from the fold;
   said central piston region being connected to and extending generally inwardly from the bottom of the inner wall segment to close and complete the unitary barrier member;
   said inner wall segment having sufficient flexibility to permit said inner wall segment and said central piston region to move in an axially upward direction under the influence of propellant pressure.
2. The barrier of claim 1 wherein said unitary barrier is comprised of PET.
3. The barrier of claim 1 wherein said unitary barrier is substantially fully nestable with further identical barrier members, the frustoconical outer and inner wall segments and intervening fold of each barrier nesting with the corresponding parts of further identical barrier members.

4. The barrier of claim 1 wherein said central piston region is flexible and expandable.

5. The barrier of claim 1 wherein said inner wall segment is slightly shorter in top to bottom dimension than said outer wall segment.

6. The barrier of claim 1 wherein said outer wall segment is thicker and more rigid than said inner wall segment.

7. The barrier of claim 1 wherein at least a portion of said central piston region is thicker and more rigid than said inner wall segment.

8. The barrier of claim 1 wherein said terminal sealing means is a flange extending outwardly from the bottom of the outer wall segment.

9. The barrier of claim 1 wherein said central piston region has an outer periphery that emerges from the inner wall segment at substantially a right angle to said inner wall segment.

10. The barrier of claim 1, wherein the barrier is multi-layered, the inner layer being impervious to the transport of product and propellant and the outer layers being inert to the product or propellant contiguous thereto.

11. A dispenser for the pressurized dispensing of product, comprising:

a container having a bottom, a side wall, a top, an opening in said top for mounting an externally actuable valve means, and a closable opening in said bottom for introducing propellant into said container;

an externally actuable valve means extending through said top opening for dispensing product from within said container;

a unitary flexible barrier sealed within said container for defining a first zone above said barrier for holding the product in fluid communication with said valve means and a second zone below said barrier for holding a propellant out of fluid communication with said first zone;

said barrier being a shaped spatial form having a terminal sealing means, a flexible wall portion, and a central piston region, said sealing means, wall portion and piston region being formed as a unitary spatial form with sufficient rigidity to maintain its shape prior to and during insertion into said container;

said flexible wall portion having an inner wall segment and an outer wall segment connected by a fold;

said outer wall segment being a steeply frusto-conical shape and extending upwardly from the terminal sealing means to the fold, said outer wall segment and fold being dimensioned upon insertion into the bottom of a container to form an initial spaced relationship with the inner side container surface;

said inner wall segment being an oppositely-directed, steeply frusto-conical, shape contained within the outer wall segment and extending downwardly from the fold;

said central piston region being connected to and extending generally inwardly from the bottom of the inner wall segment to close and complete the unitary barrier member;

said inner wall segment having sufficient flexibility to permit said inner wall segment and said central piston region to move in an axially upward direction under the influence of propellant pressure.

12. The invention of claim 11 wherein said unitary barrier is comprised of PET.

13. The invention of claim 11 wherein said unitary barrier is substantially fully nestable with further identical barrier members, the frustoconical outer and inner wall segments and intervening fold of each barrier nesting with the corresponding parts of further identical barrier members.

14. The invention of claim 11 wherein said central piston region is flexible and expandable.

15. The invention of claim 11 wherein said inner wall segment is slightly shorter in top to bottom dimension than said outer wall segment.

16. The invention of claim 11 wherein said outer wall segment is thicker and more rigid than said inner wall segment.

17. The invention of claim 11 wherein at least a portion of said central piston region is thicker and more rigid than said inner wall segment.

18. The invention of claim 11 wherein said terminal sealing means is a flange extending outwardly from the bottom of the outer wall segment.

19. The invention of claim 11 wherein said central piston region has an outer periphery which is connected at substantially a right angle to said inner wall segment.

20. The invention of claim 11 wherein the barrier is multi-layered, the inner layer being impervious to the transport of product and propellant and the outer layers being inert to the product or propellant contiguous thereto.

21. A dispenser, absent propellant and product, which is suitable for the pressurized dispensing of product, comprising:

a container having a bottom, a side wall, a top, an opening in said top for mounting an externally actuable valve means, and a closable opening in said bottom for introducing propellant into said container;

an externally actuable valve means extending through said top opening for dispensing product from within said container;

a unitary flexible barrier sealed within said container for defining a first zone above said barrier for holding the product in fluid communication with said valve means and a second zone below said barrier for holding a propellant out of fluid communication with said first zone;

said barrier being a shaped spatial form having a terminal sealing means, a flexible wall portion, and a central piston region, said sealing means, wall portion and piston region being formed as a unitary spatial form with sufficient rigidity to maintain its shape prior to and during insertion into said container;

said flexible wall portion having an inner wall segment and an outer wall segment connected by a fold;

said outer wall segment being a steeply frusto-conical shape and extending from the terminal sealing means to the fold, said outer wall segment and fold being dimensioned such that upon insertion of the barrier into the container an initial spaced relationship is formed with the inner side container surface;

said inner wall segment being an oppositely-directed, steeply frusto-conical shape contained within the outer wall segment and extending from the fold;

said central piston region being connected to and extending across the area defined by the circumference of the inner wall segment to close and complete the unitary barrier member;

said inner wall segment having sufficient flexibility to permit said inner wall segment and said central piston region to move in an axial direction within the container.

* * * * *